(12) United States Patent
Mader et al.

(10) Patent No.: US 7,223,027 B2
(45) Date of Patent: May 29, 2007

(54) OPTICAL COMMUNICATIONS ADAPTER MODULE CONFIGURED FOR USE INSIDE A XENPAK-SIZED MODULE

(75) Inventors: Thomas B. Mader, Los Gatos, CA (US); Steve J. Buchheit, deceased, late of Menlo Park, CA (US); by Robert F. Buchheit, legal representative, Menlo Park, CA (US); Dana L. Rose, San Jose, CA (US); Daehwan D. Kim, Sunnyvale, CA (US); Joshua T. Oen, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 10/748,632

(22) Filed: Dec. 30, 2003

(65) Prior Publication Data

US 2005/0141841 A1    Jun. 30, 2005

(51) Int. Cl.
*G02B 6/36* (2006.01)
(52) U.S. Cl. .......................... 385/92; 385/88; 398/135; 398/139
(58) Field of Classification Search ............ 385/88–94; 398/135–139
See application file for complete search history.

(56) References Cited

U.S. PATENT DOCUMENTS

| | | | |
|---|---|---|---|
| 5,218,654 A * | 6/1993 | Sauter ........................ 385/24 |
| 5,233,675 A | 8/1993 | Cannetti | |
| 5,708,745 A * | 1/1998 | Yamaji et al. ................ 385/92 |
| 5,887,098 A | 3/1999 | Ernst et al. | |
| 6,206,577 B1 | 3/2001 | Hall, III et al. | |
| 6,347,888 B1 | 2/2002 | Puetz | |
| 6,364,537 B1 | 4/2002 | Maynard | |
| 6,461,055 B1 | 10/2002 | Zimmel | |
| 6,568,861 B2 | 5/2003 | Benner et al. | |
| 6,599,024 B2 | 7/2003 | Zimmel | |
| 2003/0147385 A1* | 8/2003 | Montalvo et al. ........... 370/389 |
| 2005/0036746 A1* | 2/2005 | Scheibenreif et al. ......... 385/92 |

\* cited by examiner

*Primary Examiner*—Brian Healy
*Assistant Examiner*—Derek L. Dupuis
(74) *Attorney, Agent, or Firm*—Schwabe, Williamson & Wyatt, P.C.

(57) ABSTRACT

An optical communications adapter module is provided which includes a casing of a XENPAK-sized module and an optical communications board assembly positioned within the casing. The module also includes a first optical connector coupled to a second optical connector by fiber optics capable of communicating data between the first optical connector and the second optical connector where the first optical connector is coupled to a data transmission connector of the optical communications board assembly and the second optical connector is positioned at a face plate of the casing. The module also includes a third optical connector coupled to a fourth optical connector through fiber optics capable of transmitting data where the third optical connector is coupled to a data reception connector of the optical communications board assembly and the fourth optical connector is positioned at the face plate of the casing.

12 Claims, 5 Drawing Sheets

OPTICAL COMMUNICATIONS ADAPTER MODULE CONFIGURED FOR USE INSIDE A XENPAK-SIZED MODULE

FIELD OF THE INVENTION

The present invention relates to apparatus and methods for optical data transmission and, more particularly, to converting between optical communications module formats.

BACKGROUND OF INVENTION

Optical components are modular building blocks that enable networking and communications equipment manufacturers to create standards based products to communicate data over optical data lines.

Therefore, there is a need to convert between different optical data transmission card standards in an intelligent, cost effective manner.

BRIEF DESCRIPTION OF THE DRAWINGS

Embodiments of the present invention will be readily understood by the following detailed description in conjunction with the accompanying drawings. To facilitate this description, like reference numerals designate like structural elements. The invention is illustrated by way of example and not by way of limitation in the figures of the accompanying drawings.

DETAILED DESCRIPTION OF EMBODIMENTS OF THE INVENTION

Figure 1:
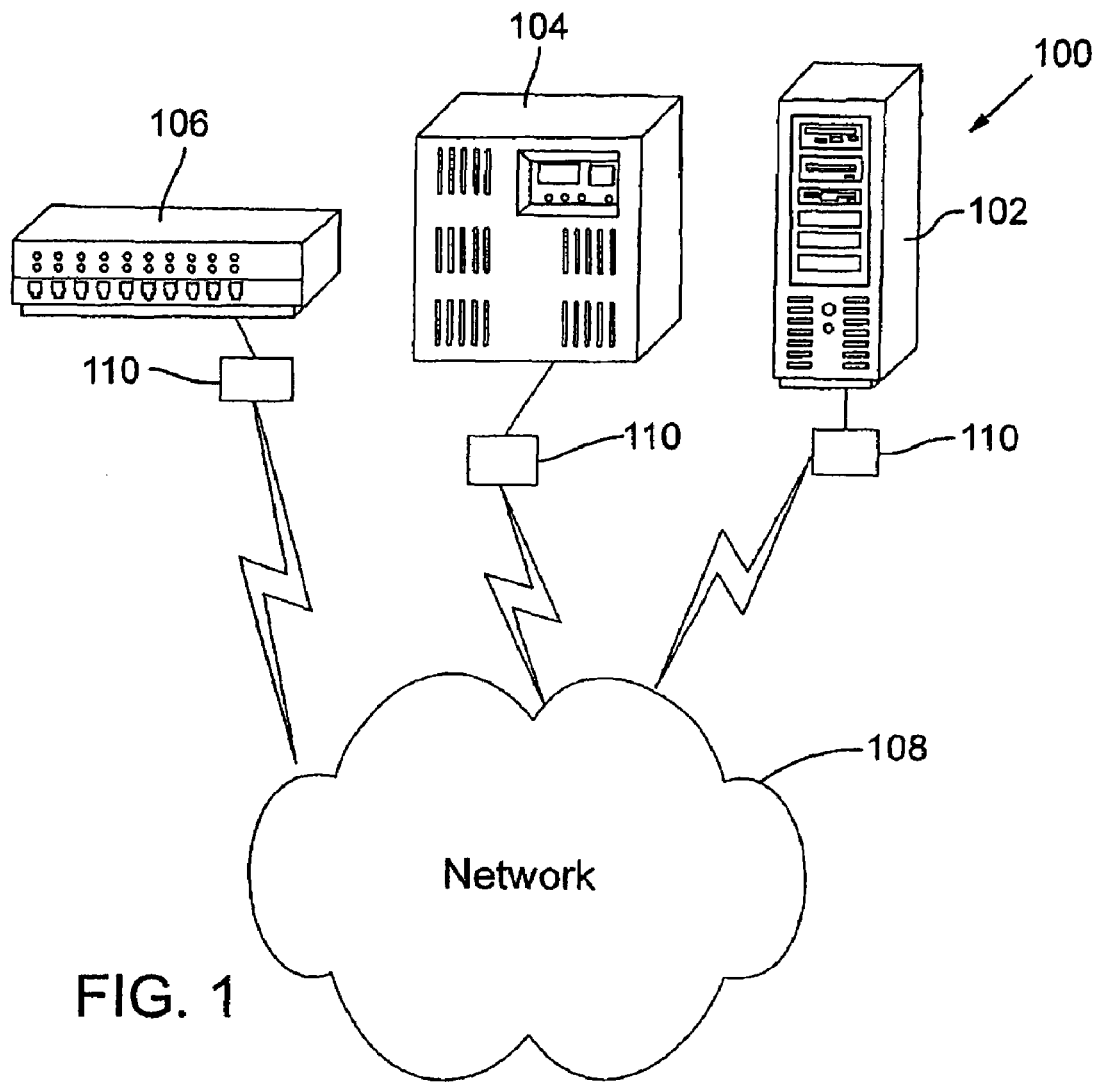
FIG. 1 shows an optical communications network in accordance with one embodiment of the present invention.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

XENPAK (10 Gigabit Ethernet Transceiver Package), XPAK (e.g., 10 Gigabit Package but shorter than XENPAK), X2, and XFP (10 Gigabit Small Form Factor Pluggable) are different optical communications transmission module standards resulting from multi-source agreements (MSA's) among several manufacturers with regard to 10 Gigabit Ethernet optical transmission cards. XENPAK, XPAK, X2, and XFP define optical transceivers which conform to the 10 Gigabit Ethernet standard as stated by the IEEE (Institute of Electrical & Electronics Engineers) 802.3.

XENPAK generally utilizes SC (subscription channel) fiber optic connectors on one end and utilizes an industry standard 70 pin electrical connector on the other end to connect with client computing devices to facilitate data communications to a network or any suitable type of computing and/or telecommunications device. As known to those skilled in the art, an SC connector is a fiber optic connector. XENPAK modules generally utilize a four wide XAUI (10 gigabit per second attachment unit interface) and are configured to be hot pluggable.

The XPAK is generally a 10 gigabit hot pluggable module that provides flexible I/O and PCI compatibility. On one end, the XPAK assembly board utilizes a standard 70 pin electrical connector to connect with client computing devices to facilitate data communications with a network or other computing and/or telecommunication devices through the optical connectors. On the other end, the XPAK board assembly within the XPAK module generally utilize LC connectors to connect to other computing devices and/or networks.

Embodiments of the present invention can enable a board assembly from the XPAK module to be used in a XENPAK-sized packaging unit (also known as casing). This enhances the flexibility of optical communication card manufacturers because a board assembly designed to fit into a XPAK module can be utilized in a XENPAK-sized casing. Without using the embodiments of the present invention, the same board assembly of an XPAK module would create an incorrect position of the optical interface when placed within the XENPAK-sized casing. By use of the embodiments of the present invention this optical offset may be corrected and therefore such an offset is not present at the XENPAK-sized casing even when an XPAK board assembly is utilized.

X2 modules with X2 board assemblies are extremely similar in structure to XPAK modules. One difference between the X2 board assembly and the XPAK board assembly is that the X2 board assembly utilizes SC connectors as opposed to LC connectors. Besides using different optical connectors, X2 and XPAK have similar functionalities and structures. Consequently, by utilizing the embodiments of the present invention, it should be appreciated that X2 board assemblies may also be utilized in a XENPAK-sized casing to generate an X2 to XENPAK adapter module.

In yet another embodiment, an XFP board assembly may be used from an XFP module for conversion into a XENPAK-sized module. This may be accomplished by utilizing a board extender for the XFP board assembly to extend the XFP electrical connector.

FIG. 1 shows an optical communications network 100 in accordance with one embodiment of the present invention.

In one embodiment, the communications network 100 includes a server 102, router 104, and a hub 106 that is in communication with a network 108. It should be appreciated that the server 102, router 104, and the hub 106 are exemplary computing apparatuses (e.g., client devices, client computing devices, etc.) that may be in optical communication with the network 108. In one embodiment, the client device may include a microprocessor and a network processor coupled to one another. It should be appreciated that the network processor and the microprocessor may be coupled in any suitable fashion. Consequently, any suitable types and/or numbers of computing or telecommunications devices may utilize an optical communications adapter module 110 (e.g., XPAK board assembly to XENPAK-sized module, X2 board assembly to XENPAK-sized module, XFP board assembly to XENPAK-sized module, etc.) described herein to communicate with the network 108. The module 110 as described herein may be any apparatus that may be of any suitable configuration that can facilitate data communications utilizing an optical communications assembly board from one type of optical communications device within a packaging or casing of another optical communications device with a different size and/or configuration. In one embodiment, the module 110 is a XENPAK-sized module or transponder that utilizes an assembly board from a different type of optical communications module such as, for example, an XPAK assembly board, an X2 assembly board, an XFP assembly board, etc.

It should also be appreciated that the network 108 may include any suitable type and/or number of computing or telecommunications device(s). In one embodiment, each of the server 102, router 104, and the hub 106 includes the adapter module 110. Although the module 110 is depicted as being outside of the server 102, router 104, and the hub 106 to show that communication with the network is facilitated by the module 110, the module 110 for each of the computing devices may be contained internally within the server 102, router 104, and the hub 106. In one embodiment, the module 110 may connect to a bus of a computing device. Therefore, it should be appreciated that any module 110 may be connected in any suitable fashion to the computing device as long as the optical connectors of the module 110 may be accessed to communicate with other devices. The optical communications adapter module 110 may be any suitable device that includes one type of optical communications assembly board such as, for example, an XPAK board assembly, an X2 board assembly, XFP board assembly, etc., that has been utilized to generate another optical communications module of a different type such as, for example, a XENPAK-sized module. It should be appreciated that a board assembly may be any suitable card or board with circuitry or components that enables computing functions such as, for example, optical communications between the client computing device and external computing devices and/or networks.

Figure 2:
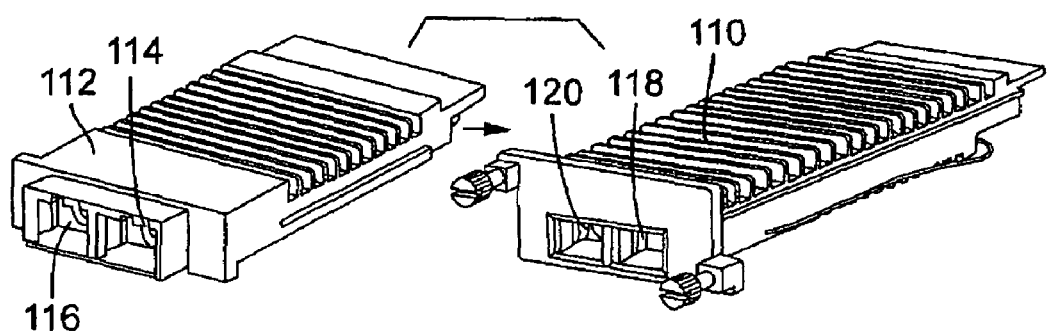
FIG. 2 shows a conversion from an XPAK module to an optical communications adapter module in accordance with one embodiment of the present invention.
Figure 3:
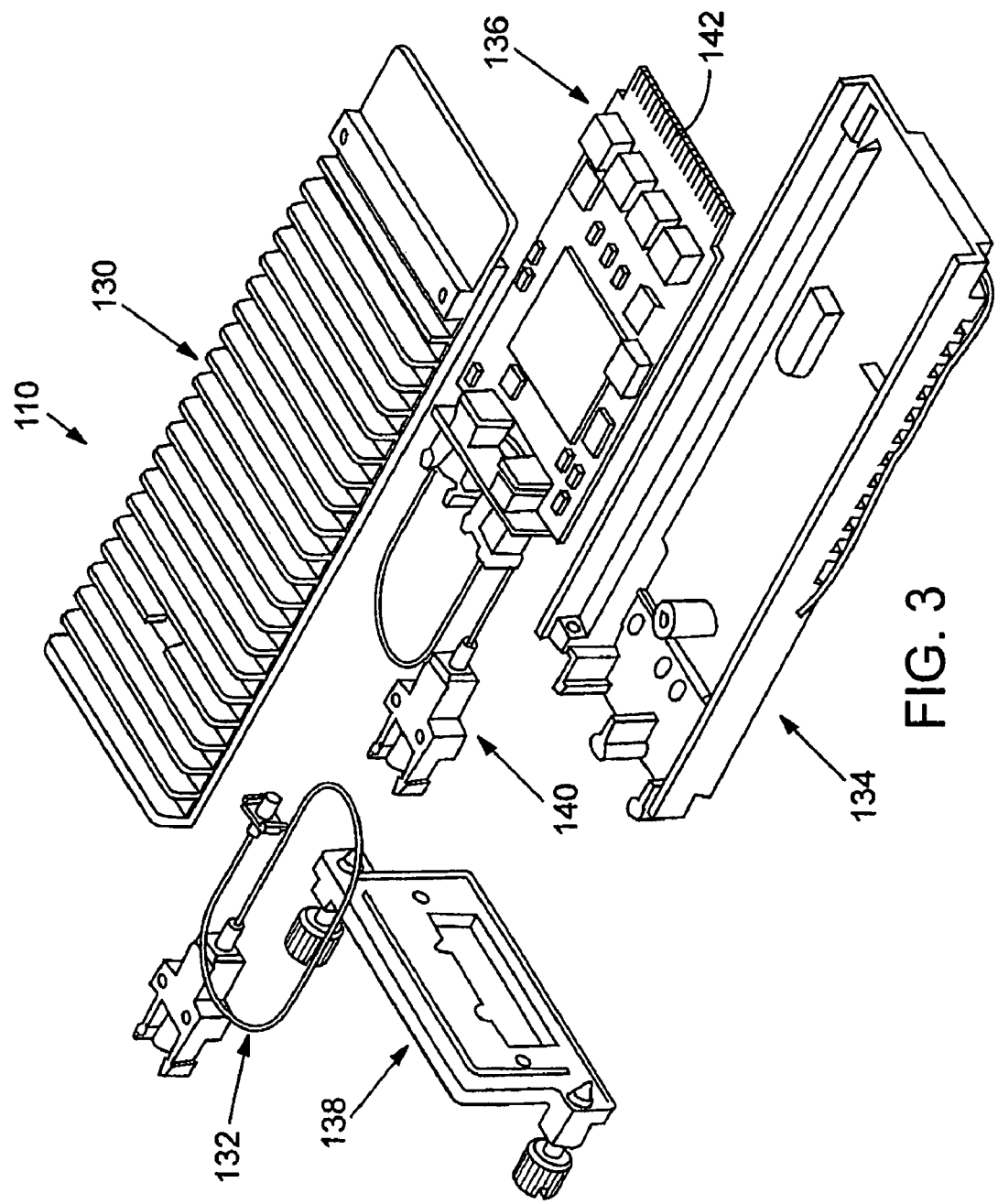
FIG. 3 shows an exploded view of an optical communications board assembly being utilized to generate an optical communications module in accordance with one embodiment of the present invention.
Figure 4:
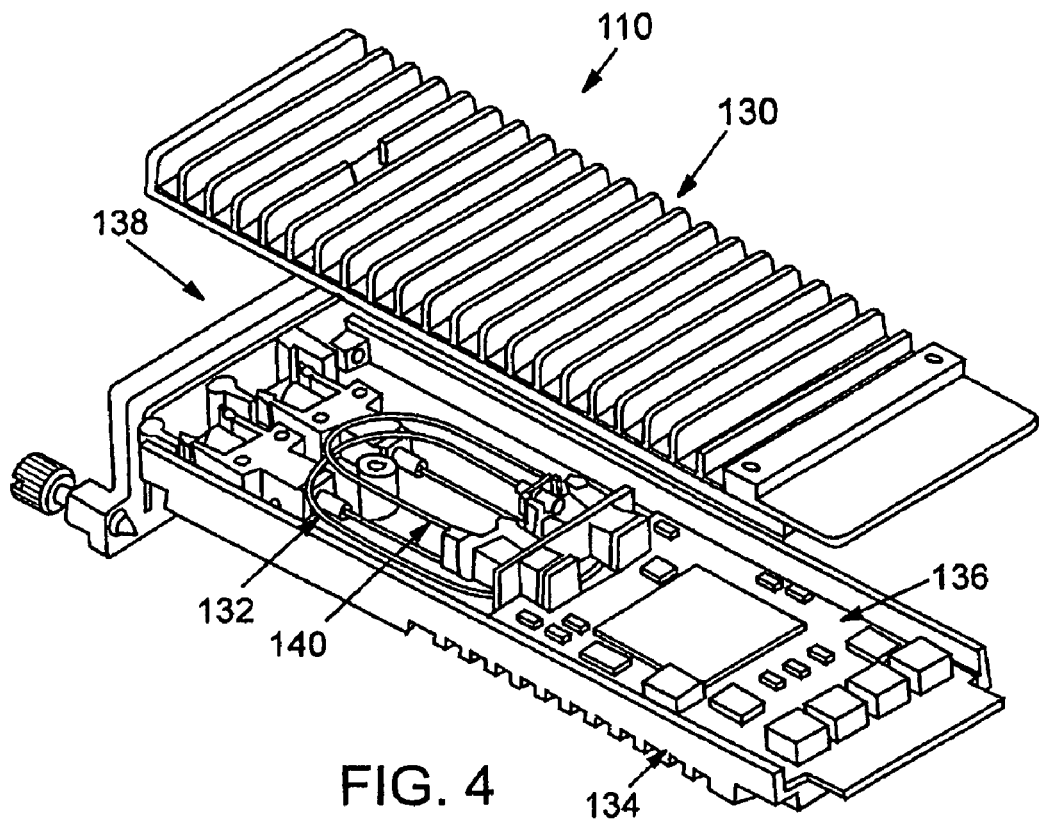
FIG. 4 shows a substantially assembled view of an optical communications adapter module utilizing an XPAK board assembly in accordance with one embodiment of the present invention.

An XPAK board assembly may be utilized to generate a XENPAK-sized module by using optical conversion cords as described in further detail in reference to FIGS. 2–4.

Figure 5:
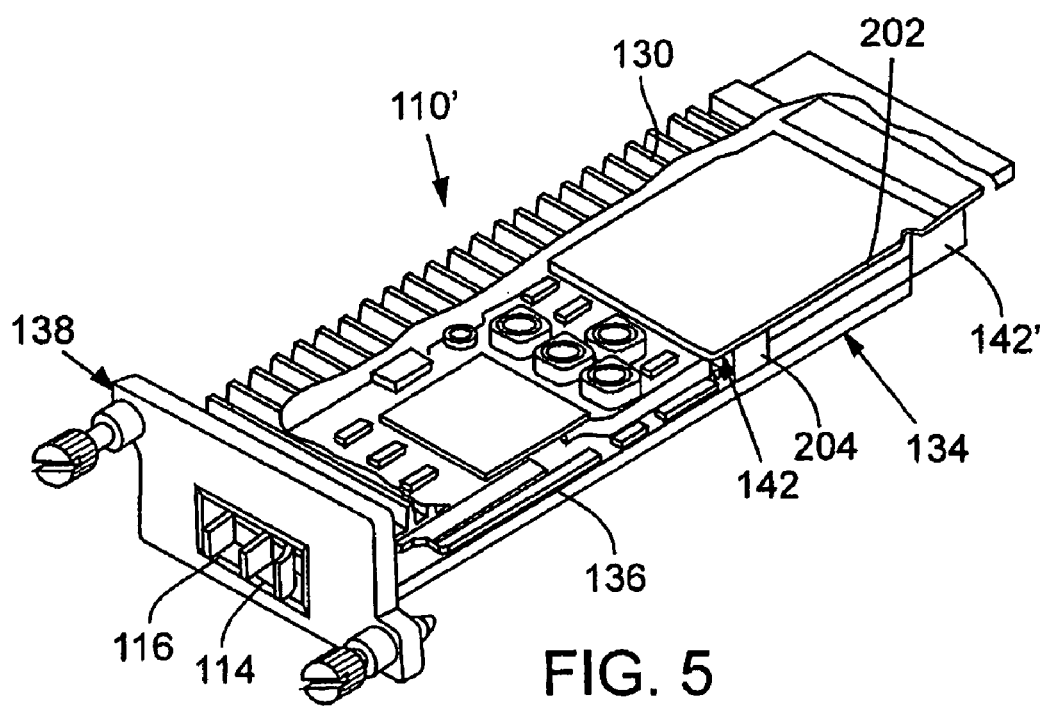
FIG. 5 illustrates an XPAK board assembly that has been electrically converted to fit into a XENPAK-sized casing to generate an optical transmission adapter module in accordance with one embodiment of the present invention.
Figure 6:
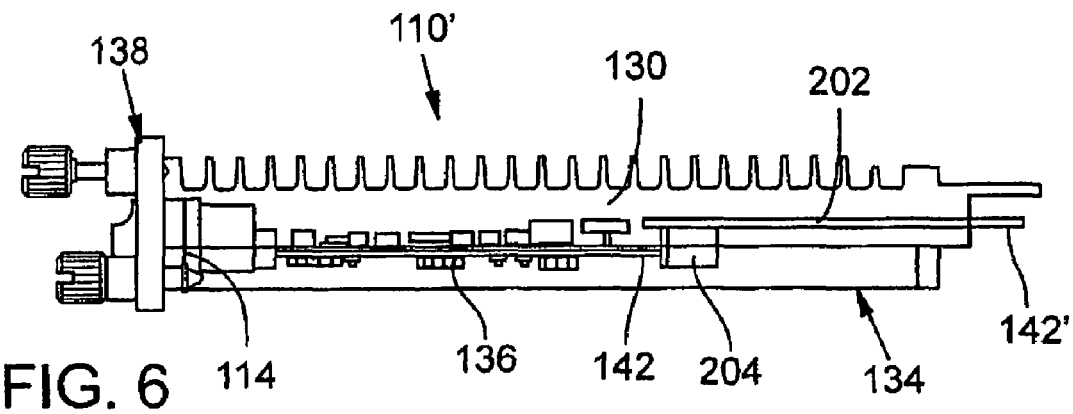
FIG. 6 illustrates a side view of the optical communications adapter module in accordance with one embodiment of the present invention.

In another embodiment, the XPAK board assembly within an XPAK module may be utilized to generate a XENPAK-sized module using an electrical extension conversion card as described in reference to FIGS. 5 and 6. In yet another embodiment, the optical communications adapter module 110 may include an X2 board assembly coupled with optical extension cords inserted into a XENPAK-sized module. In a further embodiment, the optical communications adapter module 110 may include an XFP board assembly coupled to a conversion board as described in reference to FIGS. 7–9.

FIG. 2 shows a conversion from an XPAK module 112 to an optical communications adapter module 110 in accordance with one embodiment of the present invention. In one embodiment, the XPAK module 112 may be converted into the optical communications adapter module 110 by placing an optical communications board assembly such as the XPAK board assembly from the XPAK module 112 into a XENPAK-sized packaging unit. The XPAK module 112 is generally smaller than a XENPAK-sized packaging unit/casing and utilizes a different type of optical connectors. A typical XPAK module utilizes LC optical connectors 114 and 116 while a typical XENPAK module utilizes SC optical connectors 118 and 120. As discussed in further detail in reference to FIGS. 5–6, the XPAK board assembly may be placed at a rear portion of the XENPAK-sized packaging unit and optical conversion cords may be utilized to reposition optical connectors of the XPAK board assembly to locations typically utilized in XENPAK-sized modules.

In addition, in one embodiment, the optical conversion cords may convert the XPAK LC optical connectors to optical connectors as described in further detail in reference to FIG. 3. Therefore, in such a conversion, the XPAK module 112 can be converted to a XENPAK-sized module in an intelligently and in a cost effective way by utilizing the XPAK board assembly and optical conversion cords within a XENPAK-sized packaging unit.

In a further embodiment, X2 modules may be utilized to generate a XENPAK-sized module by inserting the X2 board assembly at a rear portion of the XENPAK-sized casing and coupling optical conversion cords to the X2 board assembly to reposition optical connectors of X2 board assemblies to locations typically utilized in XENPAK-sized modules. In this type of embodiment, if SC connectors are desired in the optical communications adapter module 110, optical extension cords may be utilized with SC connectors on both ends rather than optical conversion cords with SC connectors on one end and LC connectors on the other end (as utilized if XPAK board assemblies were being used).

In another embodiment, as discussed in reference to FIGS. 5 and 6, the XPAK module 112 can be converted to a XENPAK-sized module by utilizing an electrical conversion card to extend an XPAK card to a length typically found in a XENPAK-sized module. The electrical conversion card may include connectors that can electrically couple with the XPAK board assembly and communicate the electrical signals from the XPAK board assembly to a client computing system connector. The client computing system connector may be any suitable connector that can communicate data to any suitable computing device or system that is configured for data transmission and reception such as, for example, server 102, router 104, and/or hub 106.

FIG. 3 shows an exploded view of an optical communications board assembly being utilized to generate an optical communications module in accordance with one embodiment of the present invention. In one embodiment, the optical communications board assembly is an XPAK board assembly 136 positioned within a XENPAK-sized case so the electrical connections on one end of the XPAK board assembly 136 is located at an end of the XENPAK-sized case which connects to a client computing device. In such an embodiment, a XENPAK-sized module is generated that can facilitate data communications.

In one embodiment, the XENPAK-sized case includes a top cover 130, a bottom portion 134, and a face plate 138. When the XPAK board assembly 136 is positioned in the aforementioned manner, the optical connectors 114 and 116 of the XPAK board assembly 136 are not positioned so the connectors 114 and 116 reach to the face plate 138. Therefore, one end of each of optical conversion cords 132 and 140 are coupled to the optical connectors 114 and 116 respectively. The second end of each of the optical conversion cords 132 and 140 are positioned to be located at connector openings in the face plate 138 where XENPAK optical connectors from a XENPAK board assembly would be located.

In one embodiment, the optical conversion cords 132 and 140 may each have a first end that has the SC optical connector and have a second end that has the LC optical connector. The SC optical connectors and the LC optical connectors may be coupled to each other by fiber optics that have the capability to communicate data. In such embodiments, the optical conversion cords 132 and 140 may be utilized where, for example, the optical communications board assembly has LC optical connectors (e.g., XPAK board assemblies) and the SC connectors are required in the optical communications conversion module. In one embodiment, the fiber optics may have some lag so the fiber optics are longer than the distance between the optical connectors 114 and 116 and the face plate 138. It should be appreciated that the fiber optics coupling the SC and LC connectors may be any suitable length as long as the connectors of the XPAK may be extended to the location of the face plate 138.

As discussed above, for X2 assembly board to XENPAK-sized module conversions, an X2 board assembly from an X2 module may be utilized in the above described conversion for XPAK modules except, in such an embodiment, the optical conversion cords 132 and 140 may have the same type of connectors (e.g., SC connectors) on both ends because X2 PC board assemblies typically utilize SC connectors assuming that SC connectors are desired for the XENPAK-sized adapter module.

FIG. 4 shows a substantially assembled view of an optical communications adapter module 110 utilizing an XPAK board assembly 136 in accordance with one embodiment of the present invention. In one embodiment, the components as discussed in reference to FIG. 3 are assembled and positioned into the bottom portion 134 of the XENPAK-sized case.

FIG. 5 illustrates an XPAK board assembly 136 that has been electrically converted to fit into a XENPAK-sized casing to generate an optical transmission adapter module 110' in accordance with one embodiment of the present invention. In one embodiment, when the optical connectors 114 and 116 of the XPAK board assembly 136 are placed in optical connector openings of the face plate 138 of a XENPAK-sized casing, the electrical connector 142 does not reach to a back end of the XENPAK-sized casing and therefore, the XPAK board assembly 136 cannot be connected to a client computing device by itself due to the size differential.

In one embodiment, the electrical connector 142 of the XPAK board assembly 136 is coupled to a receptacle interface 204. The receptacle interface 204 may be a part of an extender board 202. The receptacle interface 204 may be a 70 pin receptacle interface with a female connector that can connect to the electrical connector 142 of the XPAK board assembly 136 which in one embodiment, is a male 70 pin connector. The other end of the receptacle interface 204 may be a part of or may be connectable to the extender board 202 which is configured to communicate the electrical signals from the electrical connector 142 to an electrical connector 142' which, in one embodiment, has the same physical and electrical configuration as the electrical connector 142. In one embodiment, the electrical connector 142' has a 70 pin interface. In other embodiments, the electrical connector 142' may be different than the electrical connector 142 depending on the type of connections that are utilized by the client computing device to which the module is connected.

FIG. 6 illustrates a side view of the optical communications adapter module 110' in accordance with one embodiment of the present invention. The optical communications adapter in one embodiment, may be an XPAK board assembly connected to an extender board 202 within a XENPAK-sized adapter module as discussed above in reference to FIG. 5. In one embodiment, the XPAK board assembly 136 is shown as the card between the face plate 138 and the interface 204. The extender board 202 may be located between the interface 204 and the back portion of the XPAK to XENPAK-sized conversion module. The board extender may be any suitable PC card that is connectable to the interface 204 that is capable of communicating data between the electrical connector 142 and the electrical connector 142'.

In one embodiment, the extender board 202 may be a PC board with lines capable of transmitting data between the connectors 142 and 142'. It should be appreciated that the adapter module 110' with the PC board extender and the interface 204 may be utilized to make the optical connectors of the XPAK board assembly fit into connector openings of the front plate of the XENPAK-sized casing.

Therefore, by using the adapter module 110', an XPAK board assembly can be converted into a XENPAK-sized communications module.

In one embodiment, without using optical conversion cords, the module 110 may have LC connectors instead of SC connectors. Therefore, if desired, a XENPAK-sized communications module may be generated without the SC connectors if such an embodiment is desired. In yet another embodiment, the adapter module with the extender board 202 may utilize an optical connector conversion cord, as discussed above in reference to FIGS. 1 through 4, to convert the LC connectors of an XPAK board assembly to connectors. If an X2 board assembly has been utilized, such a conversion is not necessary if SC connectors are desired because as indicated above, the X2 PC board assemblies generally use SC optical connectors even though in most other aspects, the X2 PC board assemblies are similar to the XPAK board assemblies.

Figure 7:
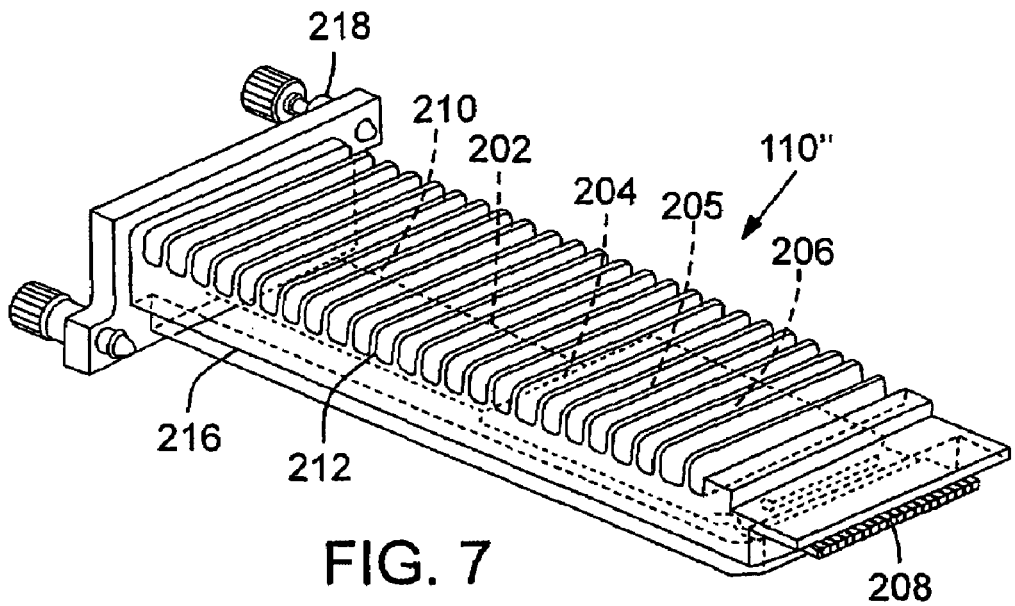
FIG. 7 illustrates an XFP board assembly that has been electrically converted to fit into a XENPAK-sized casing to generate an optical transmission adapter module in accordance with one embodiment of the present invention.
Figure 8:
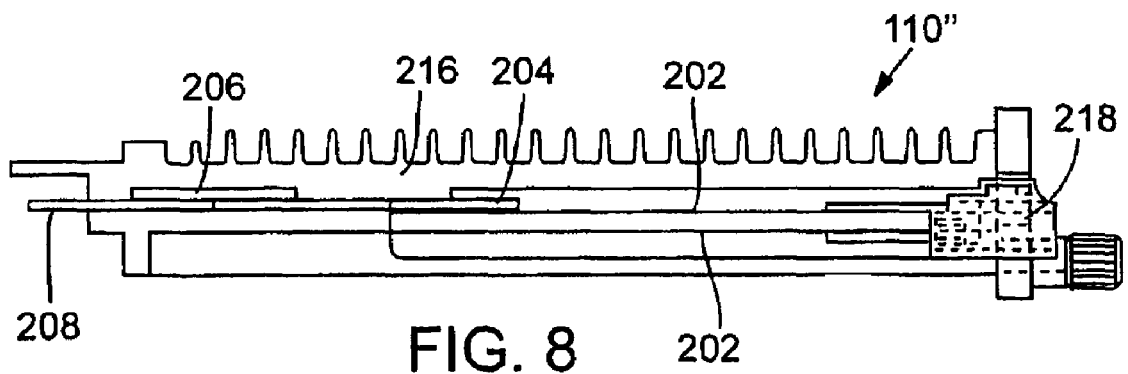
FIG. 8 illustrates a XENPAK-sized module utilizing an XFP board assembly board in accordance with one embodiment of the present invention.

FIGS. 7 and 8 describe usage of an XFP board assembly within a XENPAK-sized casing to generate a XENPAK-sized module. As a result, the functionality of an XFP assembly may be applied in an intelligent and cost effective manner where XENPAK modules are often utilized. In addition, entities that utilize XENPAK-sized modules can use the adapter modules 110 in their current line cards without any additional engineering design cost or risk. Consequently, two different solutions do not have to be developed to two different product lines.

FIG. 7 illustrates an XFP board assembly 202 that has been electrically converted to fit into an XENPAK-sized casing 216 to generate an optical transmission adapter module 110" in accordance with one embodiment of the present invention. In one embodiment, an XFP board assembly from an XFP module is placed in the XENPAK-sized casing 216. In one embodiment, the XFP board assembly may be positioned so the optical connectors are accessible through openings in the face plate 218 of the casing 216 of a XENPAK-sized module. It should be appreciated that, depending on the configuration desired, the XFP board assembly 202 may also be utilized with the optical conversion cords to be positioned in any suitable location within the XENPAK-sized casing 216.

When the XFP board assembly 202 is attached to the face plate 218 of the XENPAK-sized casing 216, a board converter 205 may be utilized to extend the data communication from the XFP board assembly 202 to a rear portion of the casing 216 where an electrical connector 208 may enable coupling and communication with a client computing device.

Generally XFP board assemblies communicate data from the optical connectors to a client computing device through a serial 10G electrical signal. XENPAK modules on the other hand communicate data from the optical connectors. As discussed above, XENPAK modules generally utilize four wide XAUI interface (10 gigabit per second attachment unit interface) to communicate four lanes of data each communicating data at almost 3 gigabits per second. Therefore, to convert the XFP electrical signal to what XENPAK generally utilizes requires a XAUI to serial chip 206. The XAUI to serial chip 206 is known to those skilled in the art. Therefore, if data communication format as typically utilized by XENPAK modules is desired, the board converter 205 may be used to convert a data transmission type from a XFP type to XENPAK type and vice versa. The board converter 205 may utilize a XAUI to serial chip 206 to convert serial data from the XFP board assembly to a four wide XAUI data communication.

FIG. 8 illustrates a XENPAK-sized module utilizing an XFP board assembly 202 in accordance with one embodiment of the present invention. In one embodiment, the XFP board assembly 202 may be positioned in the XENPAK-sized casing 216 such that optical connectors 210 and 212 are located in optical connector openings of a face plate 218. The XFP board assembly 202 may be connected to the conversion board 205. The XFP board assembly 202 may have optical connectors 210 and 212 on one end and an electrical connector 204 on a second end. In one embodiment, the electrical connector 204 is a 30 pin electrical connector. It should be appreciated that the XFP board assembly 202 may have any suitable type of electrical connector 204 opposite to the optical connector end. The electrical connector 204 may be connected to a conversion board 205 through the electrical connector 204. In one embodiment, the conversion board 205 may be an XFP to XENPAK conversion board which includes an electrical pin receptacle which may connect with the electrical connector 204. The XFP to XENPAK conversion board may include a XAUI to serial chip 206 that may convert the serial data communication utilized by the XFP board assembly 202 to and from XAUI data communication typically utilized by XENPAK modules. The XFP to XENPAK conversion board 202 may also include other circuitry like a microprocessor that may manage the optical connectors of the XFP board assembly 202.

Figure 9:
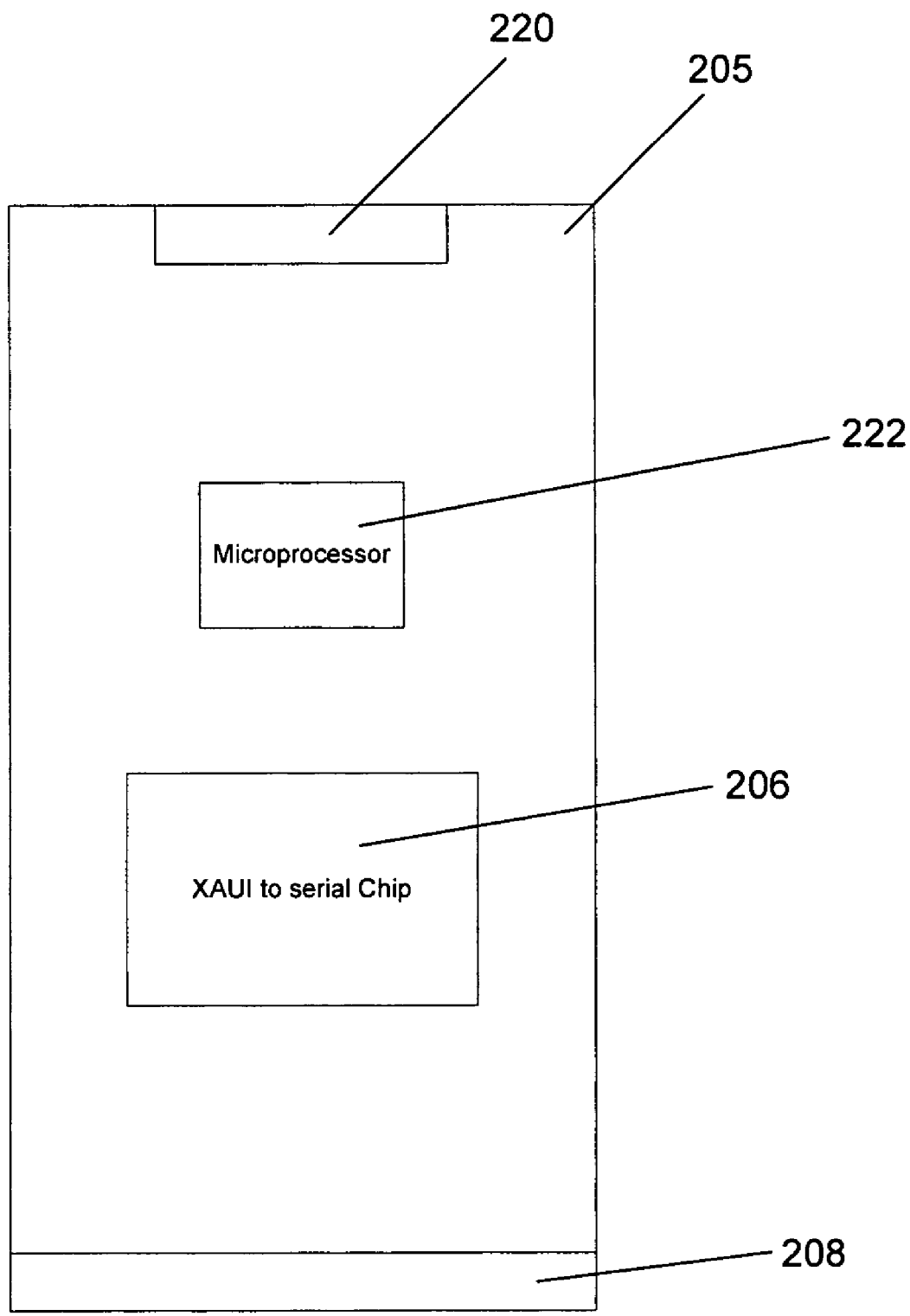
FIG. 9 illustrates a top view of a conversion board in accordance with one embodiment of the present invention.

FIG. 9 illustrates a top view of a conversion board 205 in accordance with one embodiment of the present invention. The conversion board 205 may be configured to have a connector or a receptor that has the capability to couple and communicate with the electrical connector on the XFP board assembly. On the other end of the conversion board 205, an electrical connector 208 may be configured to communicate data with a client computing device to which the module is designed to couple with. In one embodiment, the electrical connector 208 is a 70 pin electrical connector as is typically utilized in a XENPAK board assembly.

In one embodiment, the conversion board 205 may include the XAUI to serial chip 206. The XAUI to serial chip 206 may be any suitable integrated circuit capable of converting XAUI data signals to serial data signals and vice versa. Therefore, the XAUI to serial chip 206 may be configured to communicate with the electrical connectors 208 and the XFP board assembly. In one embodiment, the conversion board 205 may communicate with a client computing device by using a four lane XAUI format while the conversion board 205 may communicate with the XFP assembly board through 10 Gigabit per second serial data communications.

Another difference between data transmission between the XFP standard and the XENPAK standard is that the XFP standard generally utilizes data communication with a client computing device via an I2C interface as opposed to an management data input/output (MDIO) interface through the 70 pin XENPAK connector. Therefore, the conversion board 205 may also be configured to connect with an I2C interface of the XFP assembly board on one end and also be configured to connect using an MDIO interface on the other end to connect with a client computing device.

In one embodiment, the conversion board may also include a microprocessor 222 which may manage optical data communications of the XFP board assembly. In one embodiment, the microprocessor may assist in managing, monitoring, controlling, and alarming with respect to the laser system of the XFP board assembly. In one embodiment, the microprocessor 222 may monitor, manage, adjust, and/or generate data signals that control the laser for the optical communications. For example, the microprocessor 222 may control laser on/off, bias, temperature, input power, health of optics, etc. In another embodiment, the microprocessor may assist with any necessary conversion of data between data communication typically utilized by the XENPAK and the XFP. Therefore, the conversion board 205 may not only extend the XFP to a back portion of the XENPAK-sized casing and translate data between the XFP board assembly and the client computing device, but the conversion board 205 may also assist in managing the operation of the XFP board assembly.

Although specific embodiments have been illustrated and described herein for purposes of description of preferred embodiments, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

The invention claimed is:

1. An optical communications system, comprising:
 a client computing device including a microprocessor and a network processor coupled to one another; and
 a XENPAK-sized optical communications adapter module housing coupled to the client computing device, an optical communications board assembly of a type other than a XENPAK board assembly being positioned within the module housing so the optical communications board assembly is capable of coupling with the client computing device through an electrical connector, a first optical connector coupled with the optical communications board assembly for data transmission, a second optical connector positioned in connector openings of the module housing, a first optical conversion cord adapted to couple the first optical connector to the second optical connector.

2. An optical communications system as recited in claim 1, wherein
the first optical connector is coupled to a data transmission connector of the optical communications board assembly and the second optical connector is positioned at a face plate of the module housing; and
further comprising a third optical connector coupled with the optical communications board assembly for data transmission, the third optical connector coupled to a fourth optical connector through a second optical conversion cord, the third optical connector being coupled to a data reception connector of the optical communications board assembly and the fourth optical connector being positioned at the face plate of the module housing.

3. An optical communications system as recited in claim 2, wherein the optical communications board assembly is an X2 board assembly.

4. An optical communications system as recited in claim 2, wherein the client computing device is one of a hub, a server, and a router.

5. An optical communications system as recited in claim 2, wherein the optical communications adapter module is capable of communicating with a network.

6. An optical communications system as recited in claim 2, wherein the optical communications board assembly is an XPAK board assembly.

7. The optical communications system of claim 1 wherein the first optical connector is an LC fiber optic connector and the second optical connector is an SC fiber optic connector.

8. An optical communications system, comprising:
a client computing device including a microprocessor and a network processor coupled to one another;
a XENPAK-sized optical communications adapter module housing having an opening adapted to receive a second optical connector;
an optical communications board positioned within the module housing and having an electrical connector adapted to couple with the client computing device;
a first optical connector coupled with the optical communications board spaced a distance from the opening; and
an optical conversion cord coupled at a first end to the first optical connector and coupled at a second end to the second optical connector.

9. The optical communications system of claim 8 wherein the first optical connector is an LC connector.

10. The optical communications system of claim 8 wherein the opening is further adapted to receive a fourth optical connector, and further comprising:
a third optical connector coupled with the optical communications board spaced a second distance from the opening; and
a second optical conversion cord coupled at a first end to the third optical connector and coupled at a second end to the fourth optical connector.

11. The optical communications system of claim 10 wherein the the first optical communications connector is coupled with the optical communications board via a data transmission connector and the third optical communications connector is coupled with the optical communications board via a data reception connector.

12. The optical communications system of claim 8 further comprising a faceplate disposed in the XENPAK-sized optical communications adapter module housing, and wherein the opening is disposed in the faceplate.

* * * * *

UNITED STATES PATENT AND TRADEMARK OFFICE
CERTIFICATE OF CORRECTION

PATENT NO. : 7,223,027 B2 Page 1 of 1
APPLICATION NO. : 10/748632
DATED : May 29, 2007
INVENTOR(S) : Mader et al.

It is certified that error appears in the above-identified patent and that said Letters Patent is hereby corrected as shown below:

Column 10

Line 4, "...an optical communications board positioned..." should read --...an optical communications board of a type than a XENPAK board positioned...--.

Signed and Sealed this

Twenty-third Day of September, 2008

JON W. DUDAS
*Director of the United States Patent and Trademark Office*